United States Patent [19]

Canestri

[11] Patent Number: 4,978,395

[45] Date of Patent: Dec. 18, 1990

[54] POLYMERIC DISPERSING AGENT

[76] Inventor: Giuseppe Canestri, Via Parisano, 84, 47037 Rimini (Forli), Italy

[21] Appl. No.: 305,751

[22] Filed: Feb. 3, 1989

[30] Foreign Application Priority Data

Feb. 10, 1988 [IT] Italy .................. 19364 A/88

[51] Int. Cl.$^5$ ............................... C08K 5/04
[52] U.S. Cl. .................. 106/499; 106/505; 549/527; 549/528; 260/404.5; 260/406; 260/407
[58] Field of Search .......... 260/404.5, 406, 407; 549/527, 528; 106/499, 505

[56] References Cited

U.S. PATENT DOCUMENTS 3,207,743  9/1965  Bried .................. 260/406

FOREIGN PATENT DOCUMENTS 663534  5/1963  Canada .................. 549/527

OTHER PUBLICATIONS

"A Novel Continous Countercurrent Process", Latourette et al., Jour. Am. Oil Chem. Soc., Nov. 1960, vol. 37, #11, pp. 559–563.

Primary Examiner—William R. Dixon, Jr.
Assistant Examiner—Helene Klemanski
Attorney, Agent, or Firm—Berman, Aisenberg & Platt

[57] ABSTRACT

Polyaddition product the molecule of which is characterized by the presence of one group

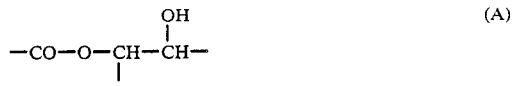

Method to prepare the above mentioned product and dispersions in polar and non polar diluents which contain the said product in addition with solid organic or inorganic particles.

5 Claims, No Drawings

POLYMERIC DISPERSING AGENT

The present invention relates to an agent for dispersing solid particles in organic fluids.

More particularly it regards polyaddition products the molecules of which are characterized by the presence of at least one group $$-CO-O-CH-CH- \quad\quad (A)$$
$$\qquad\qquad\;\;|\;\;\;\;\;\;|$$
$$\qquad\qquad\;OH$$

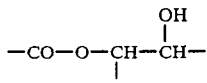

The present invention concerns, furthermore, a process to prepare the above mentioned products and compositions which contain them.

The dispersions of solid organic or inorganic particles in organic fluids are used a great deal in various fields, such as printing-inks and paints, thermoplastic materials etc.

It is known that the more widely used dispersing agents in the above mentioned fields are constituted by polycondensation products which contain residues of mono- or polyesters, derived from hydroxycarboxylic acids, most of all from 12 hydroxystearic acid and from ricinoleic acid. It is also known that tall oil, which is a by-product of cellulose, is constituted by a mixture of resin acids and by unsaturated fatty acids and that, owing to its variable composition and to variation of the nature and characteristics of each of its components, it cannot be utilized as raw material to synthesize products having characteristics sufficiently uniform and with high technological value.

On the other hand, the separation of each component and, particularly, of the fatty acids which constitute it, increases the costs so that it is no longer competitive in comparison with that of other natural products having more uniform and constant characteristics.

It is, therefore, very well known the exigency to make use of mixtures of tall oil fatty acids, as raw materials to prepare highly valuable technological products, and which have not been submitted to highly costly purifying processes.

It has been found that tall oil fatty acids can be utilized to produce a new family of dispersants, the molecule of which is characterized by the presence of one or more groups (A).

An object, therefore, of the present invention, is constituted by the polyaddition products having the formula

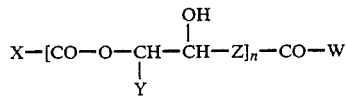

where X is the residue of a resin acid, the residue of an aliphatic carboxylic acid which has the meaning disclosed further on as regards $R_1$ and $R_2$, or an aliphatic radical which has from 7 to 24 C atoms and which may contain from one to three —CH($R_1$)—CH($R_2$)— groups wherein, in their turn, one of the substituents of $R_1$, or $R_2$ is OH, while the other one is the residue of a resin acid, of an aliphatic saturated or unsaturated carboxylic acid having from 1 to 25 C atoms or it is the residue of an aliphatic saturated or unsaturated aliphatic amine having from 1 to 11 C atoms, wherein the aliphatic chain belonging to the acid or to the amine, can be substituted by OR' or SR', wherein R' is H or an alkyl radical containing from 1 to 4 C atoms, or can be substituted by secondary, tertiary or acylated amino groups, or can be substituted by esterified carboxylic groups, or wherein $R_1$ and $R_2$, which are equal, form a covalent bond or an oxygen bridge.

Y is an aliphatic radical having from 1 to 10 C atoms and may contain one or two groups —CH$R_1$—CH$R_2$—, wherein $R_1$ and $R_2$ have the meanings described above;

Z is an aliphatic radical having from 6 to 15 C atoms and may contain one or two groups, —CH$R_1$—CH$R_2$—, wherein $R_1$ and $R_2$ have the same meanings described above;

W is OR" or $O^-M^+$ or NH-R''', where R" is H or an aliphatic chain, optionally substituted, having from 1 to 18 carbon atoms, or it is a radical of a polycondensation product of resin acid; $M^+$ is a cation, R''' is an aliphatic radical, optionally substituted, having from 3 to 101 C atoms; in their turn R" and R''' may be linked to an organic pigment by a ionic or covalent bond; and n is an integer from 1 to 22 provided that less than 25% of the groups X, Y, and Z contain a —CH($R_1$)—CH($R_2$)— group wherein $R_1$ and $R_2$ form, together, an oxygen bridge.

Examples of resin acids which may contribute, disclosing the meanings of X, $R_1$ or $R_2$, to the constitution of the compounds having the formula I, are the following: abietic acid, dehydroabietic acid, neoabietic acid, pimaric and levopimaric acid.

When X is an aliphatic radical containing at least one —CH$R_1$—CH$R_2$ group, it is, preferably, an aliphatic radical having 17 carbon atoms and containing from 1 to 3 —CH($R_1$)—CH($R_2$)—groups.

Examples of suitable aliphatic acids which may contribute, disclosing the meaning of $R_1$ or $R_2$, to the constitution of —CH$R_1$—CH$R_2$ groups, wherein one of the two substituents $R_1$ or $R_2$ is OH, are: formic acid, acetic, propionic, butyric, valeric, caproic, enanthic, caprylic, pelargonic, capric, undecanoic, lauric, tridecanoic, myristic, pentadecanoic, palmitic, margaric, stearic, nonadecanoic, arachidic, eicosanoic, behenic acid, tricosanoic, n-tetracosanoic, pentacosanoic, undecylenic, palmitic, oleic, elaidic, linoleic, linolenic, ricinoleic, arachidonic, erucic, 4,8,11,15,19 duocosanpentanoic, N-acetylglycine, N-acetylalanine, N-acetylvaline, N-acetyl-leucine, N-acetylisoleucine, N-acetylthyonine, serine, threonine, N-acetyl-cystine, diacetylgluconamine, diacetyllisine.

Examples of suitable amines which can contribute to disclose the meaning of $R_1$ or $R_2$, to constitute the groups —CH$R_1$—CH$R_2$— wherein one of the two substitutives of $R_1$ and $R_2$ is OH, are: methylamine, dimethylamine, ethylamine, diethylamine, n-propylamine, isopropylamine, n-butylamine, isobutylamine, sec-butylamine, n-amylamine, n-hexylamine, laurylamine, N,N dialkylethylenediamine, dialkyltetramethylenediamine, dialkylhexamethylenediamine, allylamine, monoethanolamine, N-ethylurea; methylic, ethylic, propylic, isopropylic, butylic, isobutylic, sec-butyl-, amylic, allylic, crotylic, propargylic and hexylic esters of glycine, alanine, valine, leucine, isoleucine, cysteine, arginine, asparagine, and methyonine.

Preferably, the aliphatic radical which contains at least one group —CH$R_1$—CH$R_2$—, has, with reference to Y, from 5 to 10 carbon atoms and, with reference to Z, from 9 to 15 carbon atoms.

Examples of possible meanings of $M^+$ are metallic or organic cations such as $Na^+$, $K^+$, $Ca^{++}$, $NH_4^+$, $(alkyl)_4N^+$ and $alkyl-NH_3^+$.

When R" is an aliphatic chain, it represents the aliphatic residue of an aliphatic saturated or unsaturated alcohol and it is, preferably, the aliphatic residue of methyl alcohol, ethyl, propyl, butyl, lauryl, cetyl, stearyl, allyl, oleyl, propargyl alcohol, of trimethylolpropane, of penthaerithritol, of hexanediol, of glycerol and of ethylene glycol monomethyl ether.

When R" is a radical of a polycondensate of a resin acid, it is preferably constituted by products which are obtained by resin acid condensation with (i) an aliphatic alcohol, such as trimethylol propane, penthaerithritol, hexanediol and glycerol, and with (ii) an acid or its reactive derivatives as, for phthalic anhydride, terephthalic anhydride, pyromellitic acid and pyromellitic anhydride.

When R'" is an aliphatic chain, it represents the residue of a saturated or unsaturated aliphatic primary amine having, preferably, from 1 to 11 carbon atoms. Examples of suitable amines are the primary amines already mentioned above as regards the meaning of $R_1$ and $R_2$.

Examples of organic pigments, which can be linked to R" and R'" through an ionic or covalent bond, are copper phthalocyanine, benzidine yellow, yellow and red pyrazolones, perylene and quinacridone pigments.

The compounds of formula I may be prepared by epoxidizing, by known methods, an aliphatic unsaturated acid containing from 8 to 25 carbon atoms and which contains from one to three double bonds. The epoxidized acid so obtained is condensed, by known methods, forming a polycondensate containing at least an (A) group. The oxirane groups which have not been reacted, can be reacted later on, using known methods, with an aliphatic carboxylic acid useful to introduce the group $R_1$ or $R_2$. Finally, if needed, the terminal carboxylic group of the polycondensate so obtained (Compound I, W=OH) is salified, esterified or transformed into an amide.

An object of the present invention, therefore, is constituted by a process of preparing products of formula I and which includes (a) epoxidation of an aliphatic unsaturated acid having from 8 to 25 C atoms and from 1 to 3 double bonds, or of one of its esters, obtained by reacting it with an alcohol of low molecular weight, using a peracid, (b) the hydrolysis of an eventual epoxy-ester, (c) reaction of the carboxylic groups of an aliphatic epoxidized acid having from 8 to 25 C atoms with oxirane groups of an aliphatic epoxidized acid having from 8 to 25 C atoms, in known catalysts' presence, giving a product having the formula

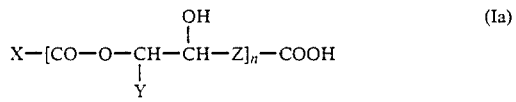

(Ia)

where
X is an aliphatic radical having from 7 to 24 C atoms and containing from 1 to 3 —CH($R_1$)—CH($R_2$)— groups, wherein $R_1$ and $R_2$ form a covalent bond or an oxygen bridge;
Y is an aliphatic radical having from 2 to 10 C atoms and may contain one or two —CH($R_1$)—CH($R_2$)— groups, wherein $R_1$ and $R_2$ form a covalent bond or an oxygen bridge;
Z is an aliphatic radical having from 6 to 15 C atoms and may contain one or two —CH($R_1$)—CH($R_2$)— groups, wherein $R_1$ and $R_2$ form a covalent bond or an oxygen bridge; and
n is an integer between 1 and 22;

and, if it is needed, (d) the reaction of the most part of the oxirane groups still present in the segments X, Y and Z, in known catalysts' presence, with resin acids, with saturated or unsaturated aliphatic carboxylic acids having from 1 to 25 C atoms and with aliphatic saturated or unsaturated amines having from to 11 C atoms and in which the aliphatic chain of the acid or of the amine may be substituted by OR' or SR', wherein R' is H or an alkyl having from 1 to 4 C atoms, by secondary, tertiary or acylated amino groups, or by esterified carboxylic groups, and, if needed, (e) the reaction, by known methods, of the carboxylic terminal group of the polycondensation product so obtained with a compound having the formula H-W where, W is OR", $O^-M^+$ or NH-R'", where, R" is an aliphatic chain, optionally substituted, having from 1 to 18 carbon atoms, or a radical of polycondensate of a resin acid, $M^+$ is a cation, R'" is an aliphatic radical, optionally substituted, having from 3 to 101 C atoms and in which R" and R'", may be linked to an organic pigment by a ionic bond or a covalent bond.

The (a) stage may be realized by known methods, such as those described in U.S. Pat. No. 3,207,743 and in EP patent No. 127,325.

Examples of peracids which may be used to realize the (a) stage, are organic aliphatic and aromatic peracids as performic acid, peracetic perbenzoic, m-chloroperbenzoic, perpropionic, trifluoroperacetic, monoperoxyphthalic and p-nitroperbenzoic.

The peracid may be prepared previously or made in situ. The formation in situ may be obtained by reacting the acid with an oxidizing agent, such as hydrogen peroxide, an acid catalyst being present.

Examples of suitable catalysts are sulfuric acid and the ion exchanging resins containing sulphonic groups.

The (a) stage may be carried on with or without the presence of a solvent.

Examples of suitable solvents are hexane, chloroform, dichloromethane, benzene, toluene, xylene, 1,2 dichloroethane and 1,1,1-trichloroethane.

The (b) stage may be carried on using steam, under pressure, an acid catalyst being present.

The stages (c) and (d) may be carried on by known methods described in the U.S. Pat. Nos. 3,968,135 and 4,017,429.

Examples of catalysts useful to promote the reaction of the oxirane group with carboxylic acid groups and amines are the following: $Cr(HCOO)_3$, $Cr(OH)(C_2H_3O_2)_2$, $[CH_3(CH_2)_3]_4NI$, $Li(CH_3)_2Cu$, $[CH_3—(CH_2)_3]_3—SnBr$ and $Br—(CH_2)_2—N(CH_3)—Br$.

Finally, also the (e) stage is carried on by elementary methods, widely known by a technician specialized in the field, to prepare salts, esters and amides of aliphatic carboxylic acids.

A preferred way of accomplishing the present invention, consists in utilizing, tall oil as raw material. More particularly distilled mixtures of tall oil, containing an average varying from 1 to 2% of saturated fatty acids, from 30 to 80% of oleic acid, from 2 to 10% of aliphatic fatty acids containing conjugated double bonds, from 10 to 60% of linoleic acid, from 0.5 to 15% of resin acids and from 1 to 3% of unsaponifiables. These mixtures may be used as they are without being submitted to any purification treatment.

It must, however, be taken into account that the fraction of unsaponifiable products contains a certain amount of stilbene, which, during further treatment, gives origin to strongly coloured products. For this reason, to prepare a product of the formula I which should not be strongly coloured, the tall oil fraction can be conveniently treated, as described in the U.S. Pat. No. 3,207,743; by formaldehyde or by a chemical compound able to release formaldehyde.

When, owing to one of the preferred methods of this invention, the basic raw material product is represented by a distilled mixture of tall oil, the greatest part of the aliphatic unsaturated carboxylic acids which are submitted to epoxidation reaction, may be represented by the following general formula:

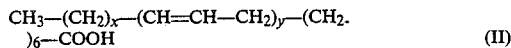

$$CH_3-(CH_2)_x-(CH=CH-CH_2)_y-(CH_2)_6-COOH \quad (II)$$

where $x=1$ when $y=3$, $x=4$ when $y=2$ and $x=7$ when $y=1$.

The mixture of unsaturated carboxylic acids, submitted to epoxidation, is constituted for the most part by oleic acid ($x=7$, $y=1$) and by linoleic acid ($x=4$, $y=2$) and, in much lower amount, by linolenic acid ($x=1$, $y=3$).

The polyaddition products of formula I, in accordance with the present invention, have very good dispersion properties. They are useful, therefore, to disperse organic pigments, inorganic pigments and other solid particles in polar and non polar diluents, and in mixture thereof.

Said dispersions constitute, therefore, an additional object of the present invention.

The dispersions related to the present invention contain from 3 to 19% of a compound of formula I of the present invention, and from 30 to 75% of solid particles. When organic particles are taken into account, the dispersions related to the present invention contain, preferably, from 7 to 15% of a compound of formula I, and from 30 to 62% of solid particles. When inorganic particles are taken into account, otherwise, the compositions related to the present invention contain, preferably, from 3 to 19% of a compound of formula I, and from 48 to 75% of solid particles.

Even more preferably the dispersions related to the present invention contain from 8 to 15% of a compound of formula I, and from 30 to 50% of organic particles or from 60 to 75% of inorganic particles when a polar diluent is used, and from to 19% of a compound of formula (1) and from 50 to of organic particles or from 48 to 75% of inorganic particles when non polar diluent is used to perform the dispersion.

Examples of suitable diluents are aliphatic and aromatic hydrocarbons, the halogenated aliphatic and aromatic hydrocarbons, aliphatic alcohols, aliphatic ketones, the esters and mixtures thereof, and thermosetting resins.

Particular examples of diluents are: benzene, toluene, xylene, chlorobenzene, carbon tetrachloride, propylacetate, n-butanol and methyl isobutyl ketone.

The dispersed solid matter is, preferably, a pigment. The dispersed particles may belong to mineral matters as chalk, kaolin, barite and talc, especially when the diluent used is represented by a melted thermosetting resin.

Examples of suitable organic and inorganic pigments are titanium dioxide, iron oxide, carbon black, chromates, molybdates, azoic pigments and phthalocyanines.

The dispersions, according to the present invention, may be prepared by known methods, such as grinding, flushing and pseudoflushing.

One of the main characteristics of the products of formula (I) is represented by the fact that they have very good dispersing properties both in polar and non polar diluents while, known products, previously considered good dispersants in non polar diluents, have poor dispersing properties in polar diluents and vice versa.

The following examples are useful to disclose the present invention, without, however, limiting it.

TABLE 1

| Components | Parts by weight | | | |
|---|---|---|---|---|
| | A | B | C | D |
| Saturated fatty acids | 2.0 | 1.0 | 2.0 | 0.9 |
| Oleic acid | 79.4 | 58.5 | 31.0 | 50.2 |
| Unsaturated fatty acids with conjugated double bonds | 2.0 | 2.6 | 5.2 | 9.6 |
| linoleic acid | 14.0 | 36.0 | 58.0 | 22.5 |
| resin acids | 0.5 | 0.9 | 1.8 | 14.4 |
| unsaponifiables | 2.0 | 1.0 | 2.0 | 2.4 |

PREPARATION I

Intermediate 1

40,000 g of the mixture A (Table 1) have been purified in a similar way to what described in Example 1 of the U.S. Pat. No. 3,207,743.

The product so obtained has a COOH equivalent of 294; the stilbene content is inferior to 0.05%.

Intermediate 2

40,000 g of the mixture B (Table 1) have been purified in a way similar to that of Intermediate 1.

The product so obtained has a COOH equivalent of 300.15; the stilbene content is inferior to 0.05%.

Intermediate 3

40,000 g of the mixture D (Table 1) have been purified in a way similar to that of Intermediate 1.

The product so obtained has a COOH equivalent of 291; the stilbene content is inferior to 0.05%.

Intermediate 4

40,000 g of the mixture D (Table 1) have been purified as described in Example 4 of the U.S. Pat. No. 3,207,743.

The product so obtained has a COOH equivalent of 291; the stilbene content is inferior to 0.05%.

PREPARATION II

Intermediate 5

14,000 g of Intermediate 1 and 14,000 g of methanol, have been esterified in a way similar to that described in Example 6 of the U.S. Pat. No. 3,207,743 catalyzing the reaction with 12 g of sulphuric acid 98%. At the end of the reaction the excess of methanol is separated.

The product so obtained has an acid value equal to zero.

PREPARATION III

Intermediate 6

12,000 g of Intermediate 1 have been dissolved in 12,000 g of hexane containing 26 g of sodium acetate and have been epoxidized utilizing 12,000 g of peracetic acid (40% in acetic acid) according to the process described in Example 2 of the U.S. Pat. No. 3,207,743. The acetic acid and the hexane have been separated under vacuum. The product so obtained has an acid value of 190 mg KOH/g and an epoxide equivalent weight of 275.

Intermediate 7

12,000 g of Intermediate 2 have been epoxidized in a way similar to that of Intermediate 6.

The product so obtained has an acid value of 187 mg KOH/g and an epoxide equivalent weight of 230.

Intermediate 8

12,000 g of mixture C have been dissolved in 12,000 g of hexane containing 26 g of sodium acetate and have been epoxidized using 12,000 g of peracetic acid (40% in acetic acid) using the same procedure described in Intermediate 6. The product so obtained is a strongly coloured red liquid (stilbene) having an acid value of 178 mg KOH/g and an epoxide equivalent weight of 196.

Intermediate 9

12,000 g of Intermediate 4 have been epoxidized in a similar way as in Intermediate 6.

The product so obtained has an acid value of 193 mg KOH/g and an epoxide equivalent weight cf 270.

Intermediate 10

14,000 g of Intermediate 5 have been epoxidized in a similar way as in Intermediate 6.

The product so obtained has an acid value of 1.2 mg KOH/g and an epoxide equivalent weight cf 280.

Intermediate 11

12,000 g of the mixture B (Table 1) have been dissolved in 12,000 g of hexane containing 26 g of sodium acetate and they have been epoxidized using 12,000 g of peracetic acid (40% in acetic acid) according to the procedure described in Intermediate 6.

The product so obtained is a strongly coloured red liquid (stilbene) having an acid value of 187 mg KOH/g and an epoxide equivalent weight of 230.

Intermediate 12

12,000 g of the mixture D (Table 1) have been dissolved and epoxidized using the same reagents and the same amount of them as described in Intermediate 6.

The product so obtained is a strongly coloured red liquid (stilbene), having an acid value of 193 mg KOH/g and an epoxide equivalent weight of 270.

Intermediate 13

12,000 g of the mixture A (Table 1) are dissolved and epoxidized adding the same reagents and the same amount of them as described in Intermediate 11 and proceeding as described in Intermediate 6.

The product so obtained is a strongly coloured red liquid (stilbene), having an acid value of 191 mg KOH/g and an epoxide equivalent weight of 275.

PREPARATION IV

Intermediate 14

14,000 g of Intermediate 10 and 46 g of oleyl naphthalenesulfonic acid are put together into a reactor fit to work at 6 atm pressure. Into the mixture there has been blown steam at 4 atm pressure, from the bottom of the reactor, maintaining the mixture at 150° C., under mechanical stirring and separating mainly methanol and water. After 8 hours, the mixture is set under vacuum (10 mm Hg residual pressure) for 2 hours and the temperature is reduced to 100° C. Then 23 g of sodium acetate are added and the mixture is kept under stirring at 100° C. for 4 hours more.

PREPARATION V

Intermediate 15

35,000 g of Intermediate 11 have been introduced into a polymer reactor together with 500 g of sodium acetate. The mixture has been heated at 150° C. for 6 hours, under mechanical stirring, blowing saturated steam at 4 atm under the surface of the reaction mixture. Then 90 g of phosphoric acid as 30% aqueous solution are added and the reaction mixture has been maintained at 150° C for 3 hours under vacuum (10 mm Hg residual pressure). The product thus obtained is a deep red coloured liquid (stilbene) having an acid value of 186 mg KOH/g and an epoxide equivalent weight of 288 (corresponding to an average of 1.04 oxirane groups for each epoxidized molecule).

PREPARATION VI

Intermediate 16

17,000 g of polymerized tall oil resin acids (acid value 140 mg KOH/g, softening temperature 140° C) 3250 g of phthalic anhydride, 5525 trimethylolpropane, 675 g of maleic anhydride, 225 g of TNPP (Weston) and 1500 g of n-xylene have been set into a polymer reactor. The mixture has been reacted at 255° C., under nitrogen stream, in reflux of solvent, separating reaction water, under mechanical stirring, until the acid value reached 26 mg KOH/g and the OH value reached 98 mg KOH/g.

The solvent has been removed under vacuum and then the reaction mixture has been poured, at 156° C., on a device useful to prepare it, by previous granulation, for packaging.

EXAMPLE 1

Product 1

12,000 g of Intermediate 6 have been introduced into a polymer reactor provided with mechanical stirrer, condenser and solvent recovery tank, vacuum device and thermostats. Then 30 g of Chromium (III) (2 ethyl)-hexanoate have been added, and the temperature has been raised to 100° C. and maintained constant for 2 hours. Then 30 g of [CH$_3$(CH$_2$)$_3$]$_4$ NI have been added and the temperature has been raised to 60° C. and maintained constant for 2 hours.

The product so obtained has an epoxide equivalent weight of 3200, an acid value of 6.5 mg KOH/g and an average of oxirane groups, for each polymerized fatty acid segment, equal to 0.09, and corresponding to 8.4 oxirane groups for every 100 fatty acid segments present in the polymer.

Product 2

12,000 g of Intermediate 7 have been polymerized in a similar way as described in Product 1.

The product thus obtained has an epoxide equivalent weight of 938, an acid value of 6.5 mg KOH/g and an average number of oxirane groups of 0.32 units for each polymerized segment, corresponding to 24.6 epoxide groups every 100 fatty acid segments present in the polymer.

Product 3

12,000 g of Intermediate 8 have been polymerized in a similar way as described in Product 1.

The product so obtained has an epoxide equivalent weight of 545, an acid value of 6.7 mg KOH/g and an average of oxirane groups of 0.55 units for each segment of polymerized fatty acid, equal to 36 epoxy groups every 100 fatty acid segments present in the polymer.

Product 4

12,000 g of Intermediate 9 have been polymerized in a similar way as described in Product 1. The product thus obtained has an epoxide equivalent weight of 153[, an acid value of 25 mg KOH/g and an average of oxirane groups of 0.19 units for each polymerized fatty acid segment, corresponding to 17.6 epoxide groups every 100 fatty acid segments present in the polymer.

Product 5

12,000 g of Intermediate 14 have been polymerized in a similar way as described in Product 1. The product thus obtained has an epoxide equivalent weight of 3280, an acid value of 7 mg KOH/g and an average number of oxirane groups of 0.09 units for each polymerized fatty acid segment, corresponding to 8.4 epoxide groups every 100 fatty acid segments present in the polymer.

Product 6

12,000 g of Intermediate 15 have been polymerized in a similar way as described in Product 1. The product thus obtained has an epoxide equivalent weight of 3600, an acid value of 6 mg KOH/g and an average of oxirane groups of 0.08 units for each polymerized fatty acid segment, corresponding to 7.6 epoxide groups every 100 fatty acid segments present in the polymer.

Product 7

12,000 g of Intermediate 11 have been polymerized in a similar way as described in Product 1.

The product thus obtained has an epoxide equivalent weight of 938, an acid value of 6.5 mg KOH/g and an average number of oxirane groups of 0.32 units for each polymerized fatty acid segment, corresponding to 24.6 epoxide groups every 100 fatty acid segments present in the polymer.

Product 8

12,000 g of Intermediate 12 have been polymerized in a similar way as described in Product 1. The product thus obtained has an epoxide equivalent of 1500, an acid value of 24.8 mg KOH/g and an average number of oxirane groups of 0.19 units for each polymerized fatty acid segment, corresponding to 18 epoxide groups every 100 fatty acid segments present in the polymer.

Product 9

12,000 g of Intermediate 13 have been polymerized in a similar way as in Product 1. The product thus obtained has an epoxide equivalent weight of 3300, an acid value of 6.8 mg KOH/g and an average number of oxirane groups of 0.09 units for each polymerized fatty acid segment, corresponding to 8.3 epoxide groups every 100 fatty acid segments present in the polymer.

EXAMPLE 2

Product 10

3,000 g of Product 2 have been introduced into a glass polymer reactor, provided with condenser, mechanical stirrer, thermometer and thermostat, together with 30 g of $Li(CH_3)_2Cu$ and 93 g of formic acid. The mixture has been heated at 160° C. for 3 hours, stirring in nitrogen stream. The product thus obtained has an acid value of 8.2 mg KOH/g, an epoxide equivalent of 2,500 and an average number of oxirane groups of 0.12 units for each polymerized fatty acid segment, corresponding to 9.2 epoxide groups every 100 fatty acid segments present in the polymer.

Product 11

3,000 g of Product 3 have been treated, in a similar way as described in Product 10, with 186 g of formic acid and 32.5 g of $Li(CH_3)_2Cu$.

The product thus obtained has ar acid value of 10 mg KOH/g, an epoxide equivalent weight of 2,000 and an average number of oxirane groups of 0.15 units, corresponding to 10.3 epoxide groups every 100 fatty acid segments present in the polymer.

Product 12

3,000 g of Product 7 have been treated in a similar way as described in Product 10. The product thus obtained has an acid value of 8.5 mg KOH/g, an epoxide equivalent of 2,520 and an average number of oxirane groups of 0.12 units for each polymerized fatty acid segment, corresponding to 9.2 epoxide groups every 100 fatty acid segments present in the polymer.

EXAMPLE 3

Product 13

9,850 g of Product 1, 460 g of $H_2N-(CH_2)_{10}-CO-HN(CH_2)_3-NH-C_{18}H_{37}$ and 300 g of xylene have been introduced into a polymer reactor. The mixture has been heated for 60 minutes at 200° C., under stirring, in reflux of solvent, in nitrogen stream, separating reaction water. Then the solvent has been removed under vacuum.

The product thus obtained is a red liquid (stilbene) and has an acid value of 2.5 mg KOH/g.

Product 14

2,300 g of Product 4, 100 g of $H_2N-(CH_2)_{10}-CO-HN(CH_2)_3-NH-C_{18}H_{37}$, 30 g of $H_2N-(CH_2)_3-NH-C_{18}H_{37}$ and 200 g of xylene, have been introduced into a polymer reactor. The reaction is carried on in a similar way as described in Product 13.

The product thus obtained is a reddish liquid (stilbene) having an acid value of 14 mg KOH/g.

Product 15

9,500 g of Product 5, 460 g of $H_2N-(CH_2)_{10}CO-HN-(CH_2)_3-NH-C_{18}H_{37}$ and 30 g of $H_2N-(CH_2$ )$_3$—NH—C$_{18}$H$_{37}$ in 300 g of xylene, have been reacted in a similar way as described in Product 13.

The product thus obtained has an acid value of 2 mg KOH/g.

Product 16

9,800 g of Product 6, together with 400 g of H$_2$N—(CH$_2$)$_{10}$—CO—HN(CH$_2$)$_3$—NH—C$_{18}$—H$_{37}$ and 30 g of H$_2$N—(CH$_2$)$_3$—NH—C$_{18}$H$_{37}$ in 300 g of xylene, have been reacted in a similar way as described in Product 13. The product thus obtained has an acid value of 3.5 mg KOH/g.

Product 17

2,300 g of Product 8 and 60 g of 2[(2-aminoethyl)-amino]ethanol in 200 g of xylene, have been reacted as described in Product 13.

The product thus obtained is a strongly red liquid (stilbene) having an acid value of 14 mg KOH/g.

Product 18

9,500 g of Product 9 and 400 g of H$_2$N(CH$_2$)$_{10}$—CO—HN—(CH$_2$)$_3$—NH—C$_{18}$—H$_{37}$ in 300 g of xylene, have been reacted in a similar way as described in Product 13. There are added 2,000 g of H$_2$N—(CH$_2$)$_3$—NH—C$_{18}$H$_{37}$, before removing the solvent.

The product thus obtained has an acid value of 0 mg KOH/g and an epoxide equivalent weight of 35,000.

Product 19

2,300 g of Product 8 and 92 g of H$_2$N—(CH$_2$)$_{10}$—CO—HN(CH$_2$)$_3$—NH—C$_{18}$H$_{37}$ in 200 g of xylene, have been reacted in a similar way as described in Product 13. There are added 2,000 g of H$_2$N—(CH$_2$)$_3$—NH—C$_{18}$H$_{37}$.

The product thus obtained has an acid value of 5 mg KOH/g and an epoxide equivalent weight of 16,500.

Product 20

3,000 g of Product 10 have been reacted in a similar way as described in Product 13, together with 65 g of isotridecylamine (BASF) in 100 g of xylene.

The product thus obtained is a liquid having an acic value of 4.5 mg KOH/g.

Product 21

3,000 g of Product 11 have been reacted, in a similar way as described in Product 13, together with 70 g of H$_2$N—CH(CH$_3$)—CH$_2$[O—CH$_2$—CH(CH$_3$)]$_6$—NH$_2$ (Etherdiamin 400 from BASF) in 100 g of xylene.

The product thus obtained is a liquid having an acid value of 5 mg KOH/g.

Product 22

3,000 g of Product 12 have been reacted, in a similar way as described in Product 13, together with 30 g of 1,3-diphenylguanidine in 100 g of xylene.

The product thus obtained is a strongly coloured red liquid (stilbene and diphenylguanidine) having an acid value of 6 mg KOH/g.

Product 23

3,000 g of Product 12 have been reacted, in the same way as described in Product 13, together with 200 g of 11-aminoundecanoic acid in 100 g of xylene.

The product thus obtained is a liquid having an acid value of 8 mg KOH/g.

EXAMPLE 4

The following products 24, 25, 26, 27 and 28 here described are polymeric dispersants useful to prepare pigment dispersions and, at the same time, they may be used as pigmented intermediates useful to produce easily dispersible pigments.

Product 24

2,650 g of copper phthalocyanine blue pigment (containing an average of 1.5 SO$_3$H groups for each phthalocyanine molecule) have been introduced into a container of a Cowless type turbo mixer, together with 200 g of ethylene glycol monomethyl ether and 7,150 g of Product 18. Then the mixture has been mixed without any auxiliary external heating at 1,000 r.p.m. for 60 minutes while the temperature of the product was raising spontaneously up to 65°-75° C.

Then the mixture has been ground by a three-roll mill, obtaining a fluid paste, the particles of which are not exceeding an average size of ten microns.

Product 25

40,000 g of an aqueous slurry containing 10% of disulfonate benzidine yellow have been mixed together with 5,800 g of Product 19 in a Voegler vertical mixer at 95° C. for 60 minutes. The water has been separated by mixing the products, according to the flushing method, under vacuum (10 mm Hg) at 100° C. for 2 hours.

Then, there have been added 200 g of ethylene glycol monomethyl ether and the product has been homogenized at 100° C. for 2 hours more.

Product 26

4,000 g of a sulfonated copper phthalocyanine blue (containing an average of 1.5 SO$_3$H groups for each molecule of pigment) have been prepared, by known methods, treating copper phthalocyanine blue pigment with chlorosulfonic acid at 110°-113° C. for 6 hours in a glass polymer reactor, thionyl chloride being present.

Then the product has been washed with ice/sodium chloride/water mixture, washed again and filtered. To the paste thus obtained, water and sodium hydroxide have been added until pH 4 has been reached.

20,000 g of the above mentioned paste containing 20% of sulfonated cooper phthalocyanine blue have been introduced into a glass polymer reactor together with 15,000 g of xylene. Then, there are added, under powerful stirring over a period of 30 minutes, 2,800 g of polyoxipropylene diamine, having an average molecular weight of 400 (Etherdiamine 400 BASF) and having the formula H$_2$N—CH(CH$_3$)—CH$_2$—[O—CH$_2$—CH—(CH$_3$)]$_6$—NH$_2$, dissolved in acetic acid. The mixture has been heated at 90° C. for 60 minutes. Then, the temperature has been raised to 130° C. in order to separate, azeotropically, the remaining water. 7,500 g of Product 8 and 500 g of PKWF 300/310 AF (Haltermann) have been introduced from a container connected with the reactor. The reaction has been carried on at 130° C. for 2 hours. The remaining solvent and reaction water have been separated under vacuum (10 mm Hg) for 60 minutes.

It is so obtained a blue paste which has been discharged at 60° C. in a container and then ground by a three-roll mill to reduce the agglomerates being present, down to an average middle size lower than 5 microns.

Product 27

10,900 g of pigment yellow 12 (C.I. No. 21090), obtained by known methods, coupling tetrazotised 3,3'-dichlorobenzidine with acetoacetanilide, have been added in a glass polymer reactor together with 13,800 g of Etherdiamine 400, from BASF, and 3,000 g of m-xylene. The mixture has been heated at 175° C., in solvent reflux, and in nitrogen stream, separating reaction water, under mechanical stirring, over a period of 5 hours. There have been so introduced, from a separate container connected with the reactor, 14,500 g of Product 8 and 1,500 g of PKWF 300/310 AF (Haltermann). The reaction has been carried on at 175° C. for 5 hours more, in solvent reflux and in nitrogen stream, under mechanical stirring, separating water reaction. The xylene has been separated under vacuum at the above mentioned temperature. A liquid paste has been thus obtained, which has been discharged from the reactor at 60° C. and then ground by a three-roll mill in order to reduce the agglomerates present, down to 4 microns.

Product 28

7,300 g of a yellow soluble dye have been prepared, by known methods, coupling tetrazotised 4,4'-diamino-2,2'-biphenyl-disulfonic acid with acetoacetanilide. This yellow dye (10% aqueous solution, at pH 4) has been introduced into a glass polymer reactor (similar to the one described in relation with the preparation of Product 26). After the addition of 4,600 g of Etherdiamin 400 from BASF and 3,000 g of xylene, the mixture has been stirred, in nitrogen stream, at 60° C. for 2 hours and then at 100° C. for 3 hours, at reduced pressure (70 mm Hg), separating in such way a remarkable amount of water. At 100° C., there have been introduced, from a container connected with the reactor, 3,500 g of Product 8 and 500 g of PKWF 300/310 AF (Haltermann). Then, the reaction has been carried at atmospheric pressure, at 175° C. for 3 hours more, in solvent reflux and in nitrogen stream, thus separating more reaction water. The reactor content has been set under vacuum (10 mm Hg) and the solvent has been separated. There have been obtained a liquid paste, which has been discharged from the reactor at 60° C. and ground by a three-roll mill, in order to reduce the agglomerates present, down to an average size of 4 microns.

The product thus obtained is a pigmented polymeric dispersant.

EXAMPLE 5

Product 29

4,000 g of Product 8, 2,500 g of Intermediate 16 and 500 g of m-xylene have been introduced into a polymer reactor. The mixture has been heated at 220° C., under mechanical stirring, in nitrogen stream and in solvent reflux for 5 hours, catalysing the reaction with 50 g of triphenylphosphine and separating the reaction water.

The solvent has been separated under vacuum and the final product is a highly viscous liquid, having an acid value of 8 mg KOH/g and an OH value of 4 mg KOH/g.

Product 30

Into a polymer reactor there have been introduced 21,325 g of Intermediate 16, 6,200 g of Product 8, 1,000 g of m-xylene and 120 g of triphenylphosphine. The mixture has been heated at 220° C. for 5 hours. The xylene has been separated under vacuum at 220° C. and the temperature has been reduced to 146° C. Then there have been introduced 375 g of Good-rite 3114 (BF Goodrich Co.), 500 g of Cyasorb UV 531 (Cyanamid Co.), 500 g of Weston 618 (Weston), 550 g of Wax A (BASF) and 550 g of Escorene UL 00728 (Esso) and the mixture has been mixed at 146° C. for 60 minutes. The polymeric product so obtained has been discharged on a metallic band, the temperature of which was 15° C., flaked and packed in polyethylene bags.

The melting point of the final product was 145° C., the acid value was of 19 mg KOH/g and the OH value was 60 mg KOH/g.

EXAMPLE 6

Dispersion 1

Equipment: W & Ph kneader mixer, having the following characteristics: capacity 15 liters, motor 4 Hp, two speeds (50 and 100 r.p.m.), heating and cooling jacket connected to an oil circulating tank (where oil can be cooled by heat exchangers), vacuum device to set vacuum inside the mixer (vacuum effectiveness 5 mm Hg), overlapping blades, hydraulic tilting device to discharge the product. Into said kneader mixer there have been introduced:

| | |
|---|---|
| 12.00 Kg | of press-cake at 22% Alkali Blue 6B from BASF (2.64 kg) |
| 0.90 kg | of Product 14 (dispersant). |
| | The products have been mixed for 15 minutes at 50 r.p.m. speed while the jacket of the mixer was heated at 60° C. |
| | Then there are added |
| 1.30 kg | of PKWF 240/270 AF (Haltermann) |
| 14.20 kg | |
| | Maintaining the temperature constant at 60° C., there have been separated, by stirring, and subsequently discharged, |
| 7.15 kg | of water |
| 7.05 kg | |
| | Then there are added and mixed |
| 3.50 kg | of press-cake at 22% Alkali Blue 6B from BASF (0.77 Kg); |
| 0.40 kg | of Product 14; and |
| 0.60 kg | PKWF 240/270 AF |
| 11.55 kg | |
| | Maintaining the temperature constant at 60° C., there have been separated, by stirring, and subsequently discharged, |
| 2.50 kg | water |
| 9.05 kg | |
| | there have been added and mixed |
| 1.50 Kg | of press-cake at 22% Alkali Blue 6B from BASF (0.22 Kg) |
| 0.10 kg | of Product 14 (dispersant); and |
| 0.38 kg | of PKWF 240/270 AF |
| 11.03 kg | |
| | Maintaining the temperature constant at 60° C., there have been separated, by stirring, and consequently discharged, |
| 2.90 kg | water |
| 8.13 kg | |
| | The content of the mixer have been set under vacuum at 75° C., at 100 r.p.m. speed, and have been kept so, until the water content of the product decreased below 4%. |
| 0.48 kg | water |
| 7.65 kg | |
| | of the final product has the following composition: 48.9% Alkali Blue 6B from BASF 18.3% Product 14 29.8% PKWF 240/270 AF Haltermann 3.0% water 100.0% |

The speed of the mixer has been reduced to 50 r.p.m.; the temperature has been reduced to 25°–30° C. and the product has been mixed during 10–15 minutes more, before being discharged in packaging containers.

The dispersion has been analysed at the microscope and there has been found that the average particles size of the agglomerates contained in it was not exceeding 3.8 microns.

The mixture dispersant/mineral oil, has been replaced, in a comparative test, by a conventional mixture, containing an alkyd resin based on azelaic acid/sulfonated castor oil/mineral oil, obtaining the following results:

maximum pigment content 38.7% (at the same viscosity level)

density (colouring power), measured at the same pigment content, 10% lower than the one of Dispersion 1.

Dispersion 2

Equipment:
(a) butterfly can mixer from Molteni, having a motor of 2.5 Hp and a speed variating from 30 to 250 r.p.m., with a stainless steel can of 8 liter capacity and a working capacity of 5 Kg.
(b) Buehler laboratory three-roll mill provided with hydraulic roller regulation, thermostat and mechanical stop for rollers progression.

Into the can of the above mentioned mixer, there have been introduced 400 g of Product 13 and 1320 g of PKWF 240/270 AF and they have been mixed for 5 minutes at 30 r.p.m. of speed. There have been introduced 1,280 g of pigment red 57:1 (C.I. No. 15850) Lithol Rubine D 4566 from BASF and they have been mixed for 5 minutes at 30 r.p.m. There have been added 1,000 g more of the above mentioned red pigment and the whole product has been mixed for 25 minutes at 30 r.p.m. speed and 1.5 minutes at 100 r.p.m.

The dispersion thus obtained, which was homogenous and fluid, has been charged by hand on the roll-mill and ground at 20 Kg/cm² of roller pressure.

The dispersion thus obtained is a fluid product, the agglomerates of which, tested at the microscope, are not exceeding 4 microns.

Dispersion 3–14

Similar results to those described in connection with Dispersion 2, have been obtained by dispersing, following the procedure described in Dispersion 2, the following pigments:

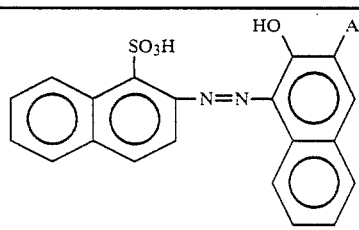

Dispersion 3  Red 49:1 (Ba salt) (A = H)
Dispersion 4  Red 49:2 (Ca salt) (A = H)
Dispersion 5  Red 63 (Ca salt) (A = COOH)

-continued

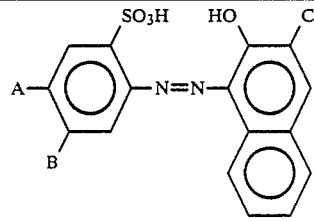

Dispersion 6   Red 48:1 (Ba salt) [A = CH₃, B = Cl, C = COOH]
Dispersion 7   Red 48:2 (Ca salt) [A = CH₃, B = Cl, C = COOH]
Dispersion 8   Red 48:4 (Mn salt) [A = CH₃, B = Cl, C = COOH]
Dispersion 9   Red 52:1 (Ca salt) [A = Cl, B = CH₃, C = COOH]
Dispersion 10  Red 52:2 (Mn salt) [A = Cl, B = CH₃, C = COOH]
Dispersion 11  Red 53:1 (Ba salt) [A = Cl, B = CH₃, C = H]
Dispersion 12  Orange 46 (Ba salt) [A = Cl, B = C₂H₅, C = H]
Dispersion 13  Red 200 (Ca salt) [A = Cl, B = C₂H₅, C = COOH]

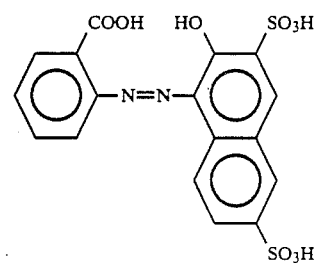

Dispersion 14  Red 60:1 (Ba salt)

The viscosity Poise (by Laray viscosimeter, at 25° C.) of the dispersions from 3 to 14 are included between 40 and 180. It has not been possible to prepare satisfactory comparative dispersions because the conventional alkyd resins do not allow to obtain the same pigment content, in concentrated pastes.

Dispersion 15

Into the can of the mixer already described in connection with Dispersion 2 there have been charged 760 g of Product 24 and 960 g of PKWF 240/270 AF. Both products have been mixed for 5 minutes at 150 r.p.m.; there have been added 1,280 g of Blue Segnale Luce NCG from BASF Italy and the mixture is stirred at 30 r.p.m. for 10 minutes. There have been added 1,000 g of Blue Segnale Luce NCG and the mixture has been stirred for 25 minutes more, at 50 r.p.m. speed, then for 1.5 minute at 100 r.p.m. speed.

Thus it has been obtained a homogeneous and fluid mixture.

The dispersion has been discharged by hand on a Buehler three-roll mill previously described and it has been ground at 20 Kg/cm² pressure.

The dispersion thus obtained is a fluid product, the agglomerates of which are not exceeding 4 microns size.

Dispersion 16

Into the can of the mixer already described in Dispersion 2, there have been weighted 720 g of Product 25 and 1,200 g of PKWF 240/270 AF. Both products have been mixed for 5 minutes at 150 r.p.m. speed.

The speed has been reduced to 30 r.p.m. and there have been added 1,080 g Rangoon Yellow from Sun Chemical (C.I. No. 21090). The mixture has been stirred at 50 r.p.m. for 5 minutes. There have been added 1,000 g more of the above mentioned yellow pigment, the whole content has been mixed for 25 minutes at r.p.m.

speed, and for 1.5 minutes at 100 r.p.m. speed. A homogeneous and fluid mixture has thus been obtained.

The dispersion has been ground by a Buehler three-roll mill with a pressure of 20 Kg/cm² on the rollers.

The dispersion thus obtained is a semi-fluid concentrated pigment paste, the agglomerates of which are not exceeding 4 microns size.

Dispersion 17–21

Similar results to those described in Dispersion 16 have been obtained dispersing, by the process described in Dispersion 16, the following pigments:

$$\text{Y}\underset{\underset{\text{X}}{|}}{\overset{\overset{\text{Z}}{|}}{\bigcirc}}-\text{NH}-\text{CO}-\underset{\underset{\text{W}}{\|}}{\overset{\overset{\text{CH}_3}{|}}{\text{C}-\text{OH}}}-\text{N}=\text{N}-\underset{\text{Cl}}{\bigcirc}-\underset{\text{Cl}}{\bigcirc}-\text{N}=\text{N}-\underset{\underset{\text{W}}{\|}}{\overset{\overset{\text{CH}_3}{|}}{\text{C}-\text{OH}}}-\text{CO}-\text{NH}-\underset{\underset{\text{X}}{|}}{\overset{\overset{\text{Z}}{|}}{\bigcirc}}-\text{Y}$$

| C.I Yellow | W | X | Y | Z |
|---|---|---|---|---|
| 13 | CH₃ | H | CH₃ | H |
| 14 | H | H | H | CH₃ |
| 17 | H | H | H | OCH₃ |
| 55 | H | H | CH₃ | H |
| 83 | H | OCH₃ | Cl | OCH₃ |

| Dispersion | C.I. Yellow | Formula C.I. | Name |
|---|---|---|---|
| 17 | 13 | No. 21100 | Diarilide AAMX |
| 18 | 14 | No. 21095 | Diarilide AAOP |
| 19 | 17 | No. 21105 | Diarilide AAOA |
| 20 | 55 | No. 21096 | Diarilide AAPT |
| 21 | 83 | No. 21108 | Diarilide AADMC |

The viscosities Poise (at 25° C.) of the dispersions from 17 to 21 are included between 120 and 140.

Comparative dispersions have been prepared replacing the mixture, Product 25/mineral oil, with a mixture of Setalin V 402 (Syntese)/mineral oil.

The viscosities and the dispersion of the pigment particles obtained with the two mixtures are practically similar, while the colouring power of the dispersions obtained with the mixture Product 25/mineral oil, is 20% higher than the one obtained with the conventional mixture Setalin V 402/mineral oil.

Dispersion 22

Into the "Molteni" one can laboratory mixer previously described, there have been charged 480 g of Product 18 and 1,240 g of PKWF 240/270. The products have been mixed at 150 r.p.m. speed, for 5 minutes. After having reduced the speed to 30 r.p.m., there have been added 1,280 g of pigment black Regal 400 R (Cabot) and the mixture has been mixed for 5 minutes at 30 r.p.m. There have been added 1,000 g more of pigment black Regal 400 R and the mixture has been mixed for 25 minutes at 50 r.p.m. speed and for 1 minute at 100 r.p.m. speed. The product thus obtained is a homogeneous and fluid mixture which has been ground by a Buehler three-roll mill at 20 Kg/cm² pressure. Thus it has been obtained a fluid dispersion, the agglomerates of which have a size lower than 4 microns, and the viscosity of which is 60 Poise (25° C.).

Dispersion 23

Into a kneader mixer (similar to the one described in relation with Dispersion 1) having tangential blades and a motor of 6 Hp, there have been introduced:

9000.0 g of press-cake at 50% of Sunfast Blue, Green Shade, from Sun Chemical (4.5 Kg).
620.0 g of Product 8;
2132.5 g of Intermediate 16;
37.5 g of Good Rite 3114;
50.0 g of Cyasorb UV 531;
50.0 g of Weston 618;
55.0 g of Wax A (BASF); and
55.0 g of Escorene UL 00728.

The jacket of the mixer has been heated at 95° C. and the speed has been set at 50 r.p.m. There have been separated 4,000 g of water. The mixture has been set under vacuum (20 mm Hg) and the mixer speed has been raised up to 100 r.p.m. for 60 minutes. The mixer has been stopped and cooled for 2 hours.

The solid mixture thus prepared has been broken into pieces running again the mixer blades for 2 minutes.

The quality of the dispersion has been evaluated by BASF method which is applied by using a microscope provided with a reticulated screen and classifies the dispersion degree from (minimum) to 7 (maximum).

The dispersion degree of Dispersion 23 is between 6 and 7.

Dispersion 24

The procedure is as described in Dispersion 23, but, Product 8, Intermediate 16 and the additives (Good Rite 3114, Cyasorb UV 531, Weston 618, Wax A and Escorene UL 00728), have been replaced by 3,000 g of Product 30.

The Dispersion 24 shows similar characteristics to those of Dispersion 23.

Dispersion 25

The procedure is as described in Dispersion 24, but Product has been replaced with the same amount (3,000 g) of Intermediate 16.

The Dispersion 25 shows much inferior qualities than those of Dispersion 23 and 24.

Dispersion 26

Equipment: turbine mixer of 20 liters capacity, able to develop 1,500 r.p.m. speed, provided with charging and discharging hopper; the discharging hopper is connected with a double screw extruder, provided with variable speed device and heating transfer device for the heating of extruding material (max 220° C.). The extruded material can be conveyed directly into a granulator provided with water cooling device.

2,500 g of Product 30 and 7,500 g of titanium white (RH D2) (I.C.I.) Pigment White 6 C.I. No. 77891) have been introduced into the aforesaid turbine mixer where they have been mixed for 90 seconds and then extruded at 130° C. The extruded product has been immediately granulated, cooled and dried in an oven for 30 minutes.

The dispersion has been evaluated in the same way as described in Dispersion 23; the dispersion degree has resulted to be between 6 and 7.

Dispersion 27

Into a one can Molteni mixer, already described in Dispersion 2, there have been introduced 1,600 g of Intermediate 10 and 400 g of Product 13. The mixture has been stirred for 2 minutes at 150 r.p.m. speed. The speed has been reduced to 30 r.p.m. and there have been introduced 2,000 g of Seikafast Red 1547 (C.I. Red 48:2, C.I. No. 15865:2). The mixture has been stirred for 15 minutes at 50 r.p.m. speed, and for 5 minutes at 100 r.p.m. speed.

The mixture has been ground through a Netzch pearl mill. There has thus been obtained a deflocculated and liquid dispersion the pigment agglomerates of which are not exceeding 3 microns. This dispersion is used in the field of plastic materials as colouring paste for epoxide matters and as colouring paste for PVC.

Dispersion 28

Into a stainless steel container, having a 4.5 liters capacity and a 14 cm diameter, there have been weighted 510 g of ethanol, 240 g of Product 17 and 1,250 g of white pigment RH D2 (I.C.I.) (P.B. 6 C.I. No. 77891). The container has been set under a laboratory Silverson mixer and the components have been mixed at 150 r.p.m. speed, for 5 minutes. Then, maintaining the mixture under stirring, there have been added 1,000 g more of white pigment. After having continued the stirring at constant speed for 15 minutes, there has been replaced the amount of solvent evaporated during the stirring process. The mixture has been ground by a Dyno horizontal laboratory ball-mill.

The product thus obtained is a liquid dispersion, finely deflocculated, the agglomerates of which are not exceeding 3.5 microns size.

The dispersion has been used to produce a flexographic ink, the vehicle of which is made by 30% nitrocellulose ¼" in ethylacetate.

A first type of ink has been prepared by mixing, for 5 minutes, by a Cowless mixer: 40 parts by weight of Dispersion 28 (the equivalent of 30 parts of pigment), 50 parts of nitro vehicle, 2 parts of wax paste and 8 parts of ethanol.

The second type of ink has been prepared by mixing, by a Silverson mixer: 30 parts by weight of the above mentioned white pigment, 50 parts of nitro vehicle, 3.2 parts of DOP, 2 parts of wax paste and 14.8 parts of ethanol.

The inks thus obtained have been drawn down one beside the other, by a spiral applicator, on transparent PVC and PE. It has been verified that the gloss of the product containing the Dispersant 28 is greater than the one of the product which does not contain it. The measures made by Byk Mallinckrodt Glossmeter at 60° C. incidence have shown a value of 90 for the first type ink and respectively, a value of 40 for the second type ink.

Dispersion 29

Pigment A: into a steel can, provided with hermetic seal, having a capacity of 2 liters there have been introduced 2,600 parts of metal balls having a diameter of 1.5 mm, 182 parts of ground copper phthalocyanine blue converted to beta form by known methods, 50 parts of Product 26 and 2,600 parts more of metal balls. The can has been closed and set to a Red Devil vibratory mixer.

Pigment B: into a can equal to the one described above, there have been introduced 2,600 parts of metal balls, 182 parts of the above mentioned copper phthalocyanine blue, 13.5 parts of sulfonated copper phthalocyanine blue described in connection with Product 26 and 2,600 parts more of metal balls. The can has been sealed and set to a vibratory mixer of the above mentioned type.

Both mixtures have been contemporarily shaked for 6 hours; then they have been discharged and sieved through a 60 mesh sieve. The properties of both pigments have been compared by mixing each pigment by a Cowless laboratory mixer, together with a high boiling liquid and then grinding them by a three-roll mill.

|  | I | II | III |
|---|---|---|---|
| Pigment A | 50 | — | — |
| Pigment B | — | 50 | 42 |
| PKWF 240/270 | 50 | 50 | 58 |
| Remarks: | (1) (2) (3) | (4) | (1) (2) (6) |
| Dispersion | good | — | very poor |
|  | (5 microns) |  | (20 microns) |
| Colouring power (7) | 100% | — | 75% |

(1) mixable
(2) grindable
(3) final product: pasty-fluid
(4) ungrindable
(5) difficult to grind
(6) final product very disotropic
(7) colouring power in let-down at 12% pigment in lithographic varnish without further grinding.

Dispersion 30

Pigment A: into a steel can like the one mentioned in Dispersion 29 there have been introduced 2,600 parts of metal balls, 182 parts of diarilide yellow 12 (C.I. No. 21090), already mentioned in relation with Product 27, 50 parts of Product 27 and 2,600 parts more of metal balls.

Pigment B: into a can equal to the above mentioned there has been introduced the same amount of metal balls and the same amount of yellow pigment 12 (C.I. 21090) omitting to add the dispersant.

Both cans have been contemporarily shaked for 6 hours, obtaining two powders which can be sieved through a 60 mesh sieve.

The properties of both pigments have been compared as described in relation with Dispersion 29.

|  | I | II | III |
|---|---|---|---|
| Pigment A | 45 | — | — |
| Pigment B | — | 45 | 36 |
| PKWF 240/270 AF | 55 | 55 | 64 |
| Remarks: | (1) (2) (3) | (4) | (1) (5) (6) |
| Dispersion | good | — | poor |
|  | (5 microns) |  | (10 microns) |
| Colouring power (7) | 100% | — | 85% |

The characters given from (1) to (7) have the same meanings as those given in relation with Dispersion 29.

Dispersion 31

Pigment A: into a stainless steel can like the one mentioned in relation with Dispersion 29, there have been introduced 2,600 parts of metal balls, 182 parts of diarilide yellow 12 (C.I. No. 21090) already mentioned in relation with Product 27, 50 parts of Product 28 and 2,600 parts more of metal balls.

Pigment B: into a can equal to the one mentioned above, there has been introduced the same amount of metal balls, 182 parts of diarilide yellow 12 and 14.9 parts of disulfonated yellow mentioned in connection with Product 28 (as dry product).

Both cans have been shaked contemporarily for 6 hours, obtaining two powders which can be sieved by a 60 mesh sieve. The properties of both pigments have been compared as described in relation with Pigment 29.

|  | I | II | III |
|---|---|---|---|
| Pigment A | 45 | — | — |
| Pigment B | — | 45 | 38 |
| PKWF 240/270 AF | 55 | 55 | 62 |
| Remarks: | (1) (2) (3) | (4) | (1) (2) (6) |
| Dispersion | good | — | poor |
|  | (5 microns) |  | (10 microns) |
| Colouring power (7) | 100% | — | 80% |

The characters given from (1) to (7) have the same meanings already mentioned in relation with Dispersion 29.

Dispersion 32

Pigment A: 1.55 Kg of soluble monoazo dye, useful for the production of pigment red 57.1 (C.I. No. 15850) have been obtained, coupling diazotized 4-toluidine-3-sulphonic acid with beta-oxynaphthoic acid. This product has been washed, filtered and soluted into a metal reactor (coated with glass fibers), into 160 liters water at 95° C. The solution thus obtained should be clear. At 95° C., there has been introduced an aqueous colloidal dispersion containing 200 g of Product 8 and a non-ionic surface active agent which has been previously heated at 60° C. The mixture has been mixed until the temperature has decreased to 70° C. Then there have been added 150 g of a sodium salt solution of Bevitak 140 (a polymer resin produced by Bergvik Kemi) at 10% in water. The whole product has been vigorously stirred for 5 minutes and then there have been introduced, from a closed container connected with the reactor, 600 g of calcium chloride as 10% aqueous solution.

The whole product has been vigorously stirred for 30 minutes at 70° C., then the temperature has been raised up to 80° C. during 30 minutes and it has been kept constant for 30 minutes more. The reactor stirrer has been stopped during 30 minutes. Then the greatest amount of the water has been separated by a pump.

The remaining product, which contained about 22% dry pigment, has been filtered and dried by known methods, at 70° C. maximum.

Pigment B: in a similar way, as described for pigment A, there has been produced a pigment here all the constituents were equal, except for the dispersant (Product 8) which has been replaced by an equal amount of the sodium salt of the above mentioned Bevitak.

The comparison tests have been carried on as described in connection with Dispersion 29.

|  | I | II | III |
|---|---|---|---|
| Pigment A | 55 | — | — |
| Pigment B | — | 55 | 55 |
| PKWF 240/270 AF | 45 | 45 | 65 |

-continued

|  | I | II | III |
|---|---|---|---|
| Remarks: | (1) (2) | (4) (5) | (1) (5) |

The characters (1) (2) (4) and (5) have the same meanings already described in connection with Dispersion 29.

I claim:

1. A dispersion in a liquid of from 30 to 75% by weight of solid particles which are insoluble in the liquid and from 3 to 19% by weight of disperant, which is a polyaddition product of the formula:

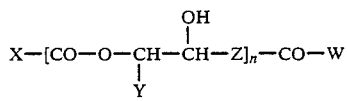

wherein

X is (a) residue of a resin acid, (b) residue of an aliphatic saturated or unsaturated carboxylic acid having from 1 to 25 C atoms, (c) aliphatic radical having from 7 to 24 C atoms and which optionally has from 1 to 3 groups of the formula:

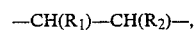

or (d) a mixture of at least two of the foregoing;

Y is an aliphatic radical having from 1 to 10 C atoms and which, optionally, further has 1 or 2 groups of the formula:

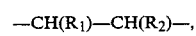

Z is an aliphatic radical having from 6 to 15 C atoms and, optionally, further has 1 or 2 groups of the formula:

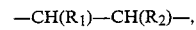

W is OR″, or O$^-$M$^+$ or NH—R‴;

n is an integer from 1 to 22;

one of $R_1$ and $R_2$ is OH, while the other is (a) residue of a resin acid, (b) residue of an aliphatic, saturated or unsaturated, carboxylic acid having from 1 to 25 C atoms or (c) residue of an aliphatic, saturated or unsaturated, amine having from 1 to 11 C atoms; the aliphatic chain of the acid or of the amine optionally being substituted by OR′ or SR′, by a secondary, tertiary or acylated amino group or by an esterified carboxylic group; or $R_1$ and $R_2$ form a covalent bond or an oxygen bridge;

R′ is H or alkyl having from 1 to 4 C atoms;

R″ is H, optionally substituted aliphatic chain having from 1 to 18 C atoms or a resin acid polycondensate radical;

M$^+$ is a cation;

R‴ is an optionally-substituted aliphatic radical having from 3 to 101 C atoms; R″ and R‴ optionally being linked to an organic pigment by an ionic or covalent bond; and wherein less than 25% of the groups X, Y and Z contain a —CH($R_1$)—CH($R_2$)— group wherein $R_1$ and $R_2$ together form an oxygen bridge.

2. A dispersion of claim 1 having from 8 to 15% by weight of the dispersant and from 30 to 50% by weight of solid particles, wherein the solid particles are organic and the liquid is a polar diluent.

3. A dispersion of claim 1 having from 8 to 15% by weight of the dispersant and from 30 to 62% by weight of solid particles, wherein the solid particles are organic and the liquid is an organic non polar diluent.

4. A dispersion of claim 1 having from 7 to 9% by weight of the dispersant and from 48 to 75% by weight of solid particles, wherein the solid particles are organic particles and the liquid is a polar diluent.

5. A dispersion of claim 1 having from 3 to 8% by weight of the dispersant and from 48 to 75% by weight of solid particles, wherein the solid particles are organic and the liquid is a non polar solvent.

* * * * *